Patented Feb. 20, 1951

2,542,782

UNITED STATES PATENT OFFICE 2,542,782

ALLYLATED POLYMERIC KETONES

Richard S. Schreiber, Wilmington, Del., assignor to E. I. du Pont de Nemours & Company, Wilmington, Del., a corporation of Delaware No Drawing. Application February 6, 1946, Serial No. 645,956

9 Claims. (Cl. 260—63)

This invention relates to new polymeric products from the allylation of linear polymeric ketones, and more particularly to the allylation of polymeric compounds from olefins and carbon monoxide, and to the resulting products.

In the copending application of Merlin M. Brubaker, S. N. 552,374, filed September 1, 1944, now abandoned, and refiled as S. N. 97,908 and issued as U. S. Patent 2,495,286, there is described a process for the preparation of linear polymeric products from carbon monoxide and unsaturated substances containing olefinic unsaturation such as monoolefins, fluorinated ethylenes, and vinyl and vinylidene compounds. The products, which are linear polymeric ketones, are obtained by heating under pressure the unsaturated substances and carbon monoxide in the presence of a suitable catalyst.

An object of the present invention is to provide a process for the modification of linear polymeric ketones such as are prepared in accord with the aforesaid Brubaker application or by any other suitable process. Another object is to provide a process for the allylation of linear polymeric ketones containing at least one hydrogen atom attached to a carbon adjacent to a ketonic carbonyl group. Yet another object is to provide new allylated linear polymeric ketones capable of insolubilization in organic solvents when heated in contact with air. A further object is to provide new compositions of matter obtained in accord with the process of the aforesaid objects. Other objects and advantages of the invention will hereinafter appear.

The modified polymeric products of the invention are prepared by reacting in solution a linear polymeric ketone having recurring polymer units containing an aliphatic carbon bearing at least one hydrogen atom contiguous to a ketonic carbonyl group and more particularly a linear polymeric compound, obtained by heating an olefin double bond containing compound with carbon monoxide under pressure in the presence of a peroxy catalyst, with an unsaturated halide of the formula

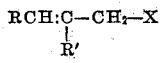

wherein R and R' are either hydrogen or alkyl groups and X is a halogen, such as an allyl chloride, an allyl bromide, or an allyl iodide or mixtures thereof in the presence of a strong nonnitrogen base such as the alkali metal oxides, hydroxides, and/or alkoxides. The products are polymeric ketones in which a number of the polymer units are believed to have at least one allyl group on the aliphatic carbon contiguous to a ketonic carbonyl group.

The process may be conducted by dissolving the linear polymeric ketone in an inert solvent, that is a solvent which does not react with the polymeric ketone, allyl halide, or alkali metal compound, for example, dioxolane, dioxane, benzene, and pyridine. The allyl halide is added to the solution of the polymeric ketone, and to the mixture is added slowly the alkali metal compound preferably as a solution in an inert solvent such as methanol. During the addition of the alkali metal compound, the reaction mixture is stirred vigorously and heated to from 40° to 100° C. under reflux. As the reaction proceeds a precipitate of alkali metal halide forms. The reaction is complete when there is no further precipitation of alkali metal halide. A slight molar excess of allyl halide over the alkali metal compound is preferably used. The proportions of allyl halide to ketone depend on the degree of allylation desired.

The reaction is applicable to any linear polymeric ketone containing at least one hydrogen atom attached to a carbon adjacent to a ketonic carbonyl group. The preferred polymeric ketones for use in the practice of this invention are those which are organic solvent soluble. The preparations of typical polymeric ketones useful in this reaction are illustrated by the following examples in which parts are by weight.

*Preparation A.*—A pressure reaction vessel is charged with 0.5 part of benzoyl peroxide and 125 parts of water, closed, evacuated, pressured to 325 atmospheres with carbon monoxide, and then further pressured to 500 atmospheres with ethylene. The temperature of the agitated reaction mixture is raised to 115° C. and maintained at 114° to 116° C. for a period of 11 hours during which the pressure is kept at 920 to 940 atmospheres by occasional repressuring with ethylene. The vessel is cooled, the excess gases are bled off, and the vessel is opened. The polymer is isolated by filtration and dried. There is thus obtained 0.25 part of a polymer having a melting point of 200 to 202° C. and giving a positive color test for keto groups with meta-dinitrobenzene and alcoholic potassium hydroxide (Biochem. J. 32, 1312 (1938)). The mol ratio of ethylene to carbon monoxide in the polymer is 1.2:1. The polymer is soluble in dimethylformamide and insoluble in toluene, methanol, acetone and acetic acid.

*Preparation B.*—A silver-lined pressure reactor is flushed with nitrogen, charged with two parts of di(tertiary butyl) peroxide and 50 parts of propylene, closed, and pressured to 400 atm. with a gas mixture consisting of 36.5% ethylene and 63.5% carbon monoxide. The reaction mixture is heated to 135° C. and kept at 133–137° C. for 15 hours, while the pressure is maintained between 850 and 1000 atm. by repressuring with the gas mixture. The reactor is cooled, bled of excess gases, and opened. The polymer obtained contains 40.4% combined carbon monoxide and has an intrinsic viscosity of 0.54 determined at 25° C. in chloroform at a concentration of 0.1 g. per 100 ml. of solution. The yield of polymer is 180 parts.

*Preparation C.*—A pressure reaction vessel is charged with 0.5 part of diethyl dioxide and 100 parts of thiophene-free benzene, closed and evacuated. Then 22 parts of isobutylene is added and the vessel is pressured to 450 atmospheres with a mixture of carbon monoxide and ethylene, which mixture contains 30% carbon monoxide. The temperature of the agitated reaction mixture is raised to 130° C. and maintained at 130° to 132° C. for a period of 17 hours during which the pressure is kept at 850 to 1000 atmospheres by occasional repressuring with the mixture of ethylene and carbon monoxide. The vessel is cooled, the excess gases are bled off, and the vessel is opened. The polymer, yield 22 parts, is milled on warm rubber rolls to remove the benzene. It contains 39% combined carbon monoxide and the presence of isobutylene as a polymer component is apparent from its infrared absorption spectrum. The intrinsic viscosity of the polymer is 0.55 (determined at 25° C. in chloroform at a concentration of 0.1 g./100 ml. of solution) and its melting point is 128° C. It forms a clear solution in chloroform or dioxane.

*Preparation D.*—A pressure reaction vessel is charged with 0.5 part of diethyl dioxide and 100 parts of thiophene-free benzene, closed, and evacuated. Then 13 parts of butadiene is added and the vessel is pressured to 450 atmospheres with a mixture of carbon monoxide and ethylene which mixture contains 30% carbon monoxide. The temperature of the agitated reaction mixture is raised to 130° C. and maintained at 126° to 131° C. for a period of 17 hours, during which time the pressure is kept at 940 to 1000 atmospheres by occasional repressuring with the mixture of ethylene and carbon monoxide. The vessel is opened. The reaction mixture is filtered through cheesecloth to remove the clear insoluble gel which amounts to 3 parts. After the benzene is removed from the clear filtrate in a current of nitrogen, there remain two parts of a clear, colorless oil which is soluble in chloroform. Its iodine number is 210. Its composition, calculated from this value and its carbon and hydrogen content is 13% carbon monoxide, 37% ethylene, and 50% butadiene.

*Preparation E.*—A pressure reaction vessel is charged with 0.5 part of diethyl dioxide, 20 parts of vinyl acetate, 50 parts of dioxan, and 50 parts of thiophene-free benzene, closed, evacuated, and pressured to 250 atmospheres with a mixture of carbon monoxide and ethylene which mixture contains 30% carbon monoxide. The temperature of the agitated reaction mixture is raised to 130° C. and maintained at 127° to 140° C. for a period of 5.5 hours, during which time the pressure is kept at 600 to 700 atmospheres by occasional repressuring with the mixture of ethylene and carbon monoxide. The vessel is cooled, the excess gases are bled off, and the vessel is opened. The polymer, yield 60 parts, is milled on warm rubber rolls to remove dioxan, benzene, and unreacted vinyl acetate. Its composition is 37% carbon monoxide, 52% ethylene, and 11% vinyl acetate. Its intrinsic viscosity (determined at 25° C. in chloroform at a concentration 0.1 g./100 ml. of solution) is 0.33 and its melting point is 115° C.

*Preparation F.*—A pressure reaction vessel is charged with 0.5 part of diethyl dioxide, 10 parts of diethyl maleate, and 100 parts of dioxan, closed, evacuated, and pressured to 250 atmospheres with a mixture of carbon monoxide and ethylene containing 30% carbon monoxide. The temperature of the agitated reaction mixture is raised to 130° C. and maintained at 129 to 142° C. for a period of 3 hours, during which time the pressure is kept at 500 to 700 atmospheres by occasional repressuring with the mixture of carbon monoxide and ethylene. The vessel is cooled, excess gases are bled off, and the vessel is opened. The polymer, yield 32 parts, is freed of dioxan and unreacted diethyl maleate by distillation of these volatile materials with steam.

*Preparation G.*—A pressure reaction vessel is charged with 0.5 part of diethyl dioxide, 10 parts of vinyl acetate, 10 parts of diethyl maleate, 50 parts of dioxan, and 50 parts of thiophene-free benzene, closed, evacuated, and pressured to 250 atmospheres with a mixture of carbon monoxide and ethylene which mixture contains 30% carbon monoxide. The temperature of the agitated reaction mixture is raised to 130° C. and maintained at 128° to 130° C. for a period of 5 hours during which the pressure is kept at 600 to 700 atmospheres by occasional repressuring with the mixture of carbon monoxide and ethylene. The vessel is cooled, the excess gases are bled off, and the vessel is opened. The solvents and unreacted monomers are removed from the polymer by distillation with steam and the polymer, yield 18 parts, is dried by milling on warm rubber rolls. Its intrinsic viscosity (determined at 25° C. in chloroform at a concentration of 0.1 g./100 ml. of solution) is 0.67 and its melting point is 110° C. It contains 43% combined carbon monoxide and 50% combined ethylene and has a saponification number of 48.

*Preparation H.*—A pressure reaction vessel is charged with 0.5 part of diethyl dioxide and closed. Then 50 parts of butadiene is added and the vessel is pressured to 300 atmospheres with carbon monoxide. The temperature of the agitated reaction mixture is raised to 130° C. and maintained at 130° to 132° C. for a period of 14 hours, during which time the pressure is kept at 850 to 900 atmospheres by occasional repressuring with carbon monoxide. The vessel is cooled, bled of excess gases, and opened. The yield of rubbery polymer is 23 parts. It contains 18% combined carbon monoxide by weight.

The above illustrate how to prepare the linear polymeric ketones which are described in greater detail in the Brubaker application supra. These polymers are, in accord with the present invention, allylated as illustrated below in which parts are by weight, unless otherwise indicated.

*Example 1.*—A solution of 35 parts by weight of the propylene/ethylene/carbon monoxide polymer made according to "Preparation B," in 200 parts of dioxane is heated to 80° C. and 110 parts by weight of allyl bromide is added rapidly. The resulting solution is stirred and kept at a boil under reflux while a solution of 49 parts by weight of potassium hydroxide (85%) in 230 parts by weight of methanol is added over a period of 1.25 hours. The reaction mixture is poured into water. The yellow, taffy-like product, which separates, is washed with water, and dried. When dry, it is a brittle solid which is soluble in acetone, cyclo-hexanone, dioxane, benzene, and xylene. The yield is 37 parts. The product contains 73.32% carbon and 8.32% hydrogen and has an iodine number of 207. These correspond to about 0.6 allyl groups per oxygen atom in the polymer.

Flow-outs on glass and steel panels from a 30% solution of the allylated polymer, in a mixture of xylene, dioxane, and cyclohexanone, containing 0.05% cobalt naphthenate (or other organo-metallic compound drier), based on the weight of polymer, upon baking for 30 min. at 150° C. yield hard, glossy films which are insoluble in solvents for the uncured allylated polymer. A steel panel which has been coated with such a film can be bent without the film coming loose from the surface. After several weeks the exposed portion of a steel panel rusts badly while the portion covered with the cured allylated ketone polymer film remains free of corrosion.

*Example 2.*—The propylene/ethylene/carbon monoxide polymer made according to "Preparation B," is treated by the procedure of Example 1 with allyl chloride rather than allyl bromide as the allylating agent. From 35 parts of the polymer there is obtained 34.5 parts of a soluble allylated ketone polymer having an iodine number of 162.

By substituting for the propylene/ethylene/carbon monoxide polymer of Example 1, any linear polymeric ketone such as are specifically described above under "Preparations" or equivalents thereof more fully detailed in the copending Brubaker application, there can be prepared allylated polymeric ketones which also may be heated to provide hard, durable, substantially insoluble polymeric products.

The polymeric ketones which can be allylated in accordance with this invention are all polymeric compounds having in the polymer unit a ketonic carbonyl group having contiguous thereto an aliphatic carbon atom bearing at least one hydrogen atom. By a polymeric ketone is meant a compound having a molecular weight of at least 1000 and having multiply recurring structural units containing a ketonic carbonyl group. Among the polymeric ketones which can be allylated by the process of this invention in addition to those described above under "Preparations" are olefin/carbon monoxide polymers generally, alkyl vinyl ketone polymers generally, such as methyl vinyl ketone polymers, other alpha, beta-ethylenically unsaturated ketone polymers such as methyl isopropenyl ketone polymer, olefin/alkyl vinyl ketone polymers such as ethylene/methyl vinyl ketone polymer, copolymers of alpha, beta-ethylenically unsaturated ketones with conjugated dienes such as methyl vinyl ketone/chloroprene polymers and the like. In addition, other polymers of the alpha, beta-ethylenically unsaturated ketones with polymerizable vinyl and vinylidene compounds, for example copolymers of methyl vinyl ketone with vinyl acetate, vinyl chloride, methyl methacrylate, and the like may be used. Preferably, the polymeric ketones are soluble in organic solvents, which is a characteristic of the linear polymers.

An unsaturated halide as used in the process of this invention is any compound represented by the following formula:

where R and R' are either hydrogen or alkyl radicals and X is chlorine, bromine, or iodine. Thus, in place of the allyl halides mentioned in the above examples, there may be used allyl iodide, methallyl chloride, methallyl bromide, methallyl iodide, crotyl chloride, crotyl bromide, and the like.

As alkali metal compounds suitable for use in the process of this invention, any of the following can be employed: sodium and potassium oxides, hydroxides, and alkoxides. The alkoxides include sodium and potassium methoxides, ethoxides, and tertiary butoxides. Any strong inorganic base may be used to effect the reaction.

The products obtained by allylation of polymeric ketones by the process of this invention are insoluble in water but are usually soluble in such organic solvents as dioxane, acetone, cyclohexanone, methyl ethyl ketone, benzene, and xylene. They may contain on the average from 0.1 to 4 allyl groups per ketonic carbonyl group in the polymer unit of the polymeric ketone, depending on the proportion of allyl halide and alkali metal compound used, and the reaction conditions. From 0.1 to 4 or more moles of allyl halide per ketonic carbonyl group may be used, depending on the degree of allylation desired. The amount of alkali metal compound used is preferably less than an equivalent relative to the alkyl halide, and should not be more than an equivalent in order to avoid undesirable side reactions.

Temperatures from 20 to 200° C. may be used in this reaction, although temperatures from 40 to 120° C. are preferred. The reaction is usually accomplished in from 1 to 2 hours but longer or shorter times may be employed depending on reaction conditions and the degree of reaction desired.

The allylated polymeric ketones of this invention are useful as adhesives and ingredients of protective and decorative coatings. They may be used with metallic driers or other catalysts to increase the rate at which they become insoluble when heated. They may be used with dyes, pigments, fillers, and plasticizers. They may also be compounded with other polymeric materials.

I claim:

1. A process which comprises adding an unsaturated carbon-carbon group to a linear polymeric ketone having recurring polymer units containing an aliphatic carbon bearing at least one hydrogen atom contiguous to a ketonic carbonyl group by heating such a linear polymeric ketone with an unsaturated halide having the structural formula

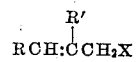

wherein R and R' are of the group consisting of hydrogen and methyl radicals and in which X is a halogen of the group consisting of chlorine, bromine and iodine, in the presence of a strong non-nitrogen base.

2. A process in accord with claim 1 wherein a soluble allylated linear product, produced in accord with said process, is insolubilized by heat-treatment in contact with air.

3. A process in accord with claim 1 wherein a soluble allylated linear product, produced in accord with said process, is insolubilized by heating in the presence of an organo-metallic compound drier in contact with air.

4. A process of adding an unsaturated carbon-carbon group to a linear polymeric ketone, which comprises reacting allyl chloride with a linear polymeric ketone having recurring polymer units containing an aliphatic carbon bearing at least one hydrogen atom contiguous to a ketonic carbonyl group in the presence of a strong non-nitrogen inorganic base.

5. A process in accord with claim 4 wherein a soluble allylated linear product, produced in accord with said process, is insolubilized by heating it in contact with air.

6. A process in accord with claim 4 wherein the soluble allylated linear product, produced in accord with the process, is insolubilized by heating in the presence of an organo-metallic compound drier in contact with air.

7. An allylated polymeric ketone having a number of recurring polymer units which contain at least one allyl group on an aliphatic carbon contiguous to the carbonyl group.

8. An allylated linear ethylene-carbon monoxide polymer.

9. An allylated linear carbon monoxide/ethylene/propylene polymer.

RICHARD S. SCHREIBER.

REFERENCES CITED

The following references are of record in the file of this patent:

UNITED STATES PATENTS

| Number | Name | Date |
|---|---|---|
| 2,318,959 | Muskat et al. | May 11, 1943 |
| 2,396,963 | Mortenson | Mar. 19, 1946 |
| 2,431,374 | D'Alelio | Nov. 25, 1947 |